United States Patent [19]

Houri et al.

[11] Patent Number: 5,222,221
[45] Date of Patent: Jun. 22, 1993

[54] METHOD AND APPARATUS FOR IMPLEMENTING A CONCURRENT LOGIC PROGRAM

[75] Inventors: Avshalom Houri, Netovot; Ehud Shapiro, Rehovot, both of Israel

[73] Assignee: Yeda Research and Development Co., Ltd., Rehovot, Israel

[21] Appl. No.: 823,047

[22] Filed: Jan. 16, 1992

Related U.S. Application Data

[63] Continuation of Ser. No. 469,793, Jan. 22, 1990, abandoned, which is a continuation of Ser. No. 290,830, Dec. 21, 1988, abandoned, which is a continuation of Ser. No. 875,114, Jun. 17, 1986, abandoned.

[51] Int. Cl.⁵ .................. G06F 09/00; G06F 09/06
[52] U.S. Cl. ............................ 395/375; 395/600; 395/650; 395/800; 364/DIG. 2; 364/977; 364/947; 364/259; 364/275
[58] Field of Search ............ 395/800, 650, 375, 600

[56] References Cited

U.S. PATENT DOCUMENTS

| | | | |
|---|---|---|---|
| 4,546,432 | 10/1985 | Umemura et al. | 364/200 |
| 4,648,044 | 3/1987 | Hardy et al. | 364/300 |
| 4,675,829 | 6/1987 | Clemenson | 364/513 |
| 4,775,934 | 10/1988 | Houri et al. | 364/300 |

Primary Examiner—Eddie P. Chan
Attorney, Agent, or Firm—Pennie & Edmonds

[57] ABSTRACT

A flat concurrent Prolog (Fcp) computer comprises a memory in which all the data is stored, three sets of registers, several queues or lists and a computer program for controlling the computer. The memory is a single data area called the "heap" which also includes two small data areas called the "trail" and the suspension table as well as the queues. The queues include the resolvent which is also called the active queue or the process queue, the activation queue, the process free list and the suspension free list. The registers include a set of general registers, a set of procedure try registers and a set of clause try registers. The general registers include a heap backtrack register, a queue front register, a queue back register, a process free list register, and a suspension free list register. The procedure try registers include a current process register, a time slice register that identifies the number of process iterations that can be done, a program counter, a failure label register that contains the address of the first instruction in the next clause to be tried, and a suspension table pointer. The clause try registers include a heap pointer register, an activation pointer register, a trail pointer register, an argument pointer register, a structure pointer register that points at an argument of a compound structure, a mode register that can specify either read or write mode, and a plurality of temporary registers for holding intermediate values during a clause try.

13 Claims, 6 Drawing Sheets

HEAP

TRAIL

SUSPENSION TABLE

QUEUES

ACTIVE OR PROCESS QUEUE

SUSPENSION QUEUE

ACTIVATION QUEUE

PROCESS FREE LIST

SUSPENSION FREE LIST

REGISTERS

HB, QF, QB, PFL, SFL

CP, TS, PC, FL, STP

HP, AP, A, SP, MODE, $X_i$

PROGRAM

FIG. 2

METHOD AND APPARATUS FOR IMPLEMENTING A CONCURRENT LOGIC PROGRAM

This is a continuation, of application Ser. No. 07/469,793, filed Jan. 22, 1990, now abandoned which is a continuation of application Ser. No. 07/290,830, filed Dec. 21, 1988 now abandoned which is a continuation of application Ser. No. 06/875,114, filed Jun. 17, 1986, now abandoned.

CROSS-REFERENCE TO RELATED APPLICATION

A related application is Application Ser. No. 875,117 for "Method and Apparatus for Concurrent Logic Program", now U.S. Pat. No. 4,775,934 filed concurrently herewith and incorporated herein by reference.

BACKGROUND OF THE INVENTION

This relates to a method and apparatus for operating a logic program and, in particular, to a method and apparatus for implementing a concurrent logic program.

A logic program is a set of axioms defining relationships between objects. A computation of a logic program is a deduction of the consequences of the axioms. Most logic programming languages require the axioms to be Horn clauses which are axioms having the form:

$$A \text{ if } B_1 \text{ and } B_2 \text{ and } \ldots \text{ and } B_n$$

This definition requires the axioms to consist only of assertions (i.e., A), denials (i.e., not A) and implications (i.e., A if $B_1$ and $B_2$ and ... and $B_n$). The first part of a clause (i.e., A) will be referred to as the head or consequence of the clause and the remainder (i.e., $B_1 \ldots B_n$) as the body or the tail or condition or antecedent. We will refer to assertions and denials as facts and implications as rules and any of these may be referred to as a clause or axiom.

Logic programming languages of this type include sequential Prolog, PARLOG, Guarded Horn Clauses, and Concurrent Prolog. Extensive material has been published on logic programming and on these programming languages. See, for example, R. A. Kowalski, *Logic for Problem Solving* (Elsevier North Holland, 1979); D. H. D. Warren, "An Abstract Prolog Instruction Set", Technical Note 309 (SRI International 1983); C. J. Hogger, *Introduction to Logic Programming* (Academic Press 1984); W. F. Clocksin and C. S. Mellish, *Programming in Prolog* (Springer-Verlag, 2d Ed. 1984); T. Conlon, *Learning MicroProlog* (Addison-Wesley 1985); K. Ueda, "Guarded Horn Clauses", ICOT Technical Report TR-103 (1985); E. Shapiro "Concurrent Prolog: A Progress Report" Technical Report CS86-10, Weizmann Institute, Israel (1985); U. Bar-On, "A Distributed Implementation of Flat Concurrent Prolog," Thesis, Dept. of Applied Mathematics, Weizmann Institute, Israel (1986); L. Sterling and E. Shapiro, *The Art of Prolog: Advanced Programming Techniques*, (MIT Press 1986).

Kowalski realized that Horn clauses could be read both declaratively, saying that A is true if $B_1$ and $B_2$ and ... and $B_n$ are true, and procedurally, saying that to prove the goal A (or execute procedure A or solve problem A) one can prove subgoals (or execute subprocedures or solve subproblems) $B_1$ and $B_2$ and ... and $B_n$. R. A. Kowalski, *Logic for Problem Solving* (Elsevier North Holland 1979).

For example, the following program identifies objects X that appear in both lists L1 and L2 (i.e., list intersection):

intersect (X, L1, L2): - member (X, L1) and member (X, L2).
member (X, [X|Xs]).
member (X, [Y|Ys]): - member (X, Ys).

Read declaratively, the first axiom reads: X is in the intersection of list L1 and L2 if X is a member of list L1 and X is a member of list L2. Read procedurally, the first axiom reads: to find an X in the intersection of lists L1 and L2, find an X which is a member of L1 and also a member of L2. The term [X|Xs] is standard list notation denoting a list whose first element is X and whose remaining elements are Xs. The axioms defining "member" read X is a member of the list whose first element is X and X is a member of the list [Y|Ys] if X is a member of Ys. The determination of membership in a list is a recursive process explained, for example, in Chapter 5 of *Learning MicroProlog*.

From Kowalski's insight a computational model for logic programs was derived. This model is based on the following principles:

A logic program is a finite set of universally quantified axioms.

An execution is the proof of an existential statement from the program.

The basic proof procedure is non-deterministic.

The proof of a goal from a logic program establishes the existence of an instance of the goal which follows from the program and also provides values for the goal variables defining such an instance. These values constitute the output of the computation. There may be many different successful computations of a goal, each resulting in a different output.

For example, in the list intersection program, let L1 be the list [2,4,6,8,10,12] and L2 the list [3,6,9,12,15]. If we then seek to prove the goal: does there exist an X such that: intersect (X, [2,4,6,8,10,12], [3,6,9,12,15]), the logic program will identify each member of list L1 and seek to establish that such member is identical to a member of list L2. Outputs for this goal will be X=6 and X=12.

The basic computation steps of a logic program proof procedure are (1) the unification of a goal with the head of a clause and (2) its reduction to (or replacement by) the subgoals specified in the body of the clause. The unification procedure is a specialized form of Robinson's resolution principle. J. A. Robinson, "A Machine-oriented Logic Based on the Resolution Principle", *Journal of the ACM*, vol. 12, pp. 23–41 (1965). Unification of two terms involves finding values that may be substituted for variables in the terms so as to make the two terms identical. See, for example, C. J. Hogger, *Introduction to Logic Programming*, p.217 (Academic Press 1984). The usual logic program task is to satisfy a conjunction of unsolved goals, which are referred to as the resolvent, by searching a database to locate facts that will unify with a goal. The various logic programming languages approximate the foregoing model and differ mainly in the manner in which the proof of a goal is constructed.

The axioms of a logic programming language are built from terms. A term is either a constant, a variable or a structure. Constants name specific objects or relationships. Variables function as pronouns in that they represent an object that cannot be named. A structure is a single object which consists of a collection of other objects. It is written in the form: f(a,b,c) where f is called the functor or predicate and the terms in parentheses are called components or arguments. A fact is written as a structure specifying a relationship between two or more objects. In such a structure, the relationship is written as the functor or predicate and the objects are written as the components or arguments. Thus the fact "John likes Mary" may be written as: likes (john, mary). A typical query to a database will have the form: ? - f(a,X) where X is a variable representing the sought after information. When it is not known what this variable stands for, the variable is uninstantiated. When the variable does stand for an object, it is instantiated.

The query provides a conjunction of goals to be satisfied. The logic programming language Prolog satisfies these goals in a sequential approximation to the logic programming model using a technique called depth first searching with backtracking. To answer a query, Prolog uses the known clauses in the database to satisfy the goals. A fact can cause a goal to be satisfied immediately if the goal unifies with the fact. A rule can only reduce the task to one of satisfying a conjunction of subgoals and can do so only if the goal unifies with the head of the rule. For example, to answer a query containing one variable, Prolog searches through the database seeking a structure having the same functor and the same components except for the variable in the same positions within the structure. If such a match is found, the variable is instantiated to the object at the corresponding position within the structure.

If a goal cannot be satisfied immediately, backtracking is initiated to find an alternative way to satisfy the goal. Thus, to satisfy a goal, Prolog searches sequentially for the first clause in the database which matches the goal and reduces this goal using that clause. Prolog then tries to solve the reduced goal instantiating variables as it goes. This is called depth first searching. If Prolog ever fails to solve a goal because all the possible clauses for a match have been tried and failed to match, then it backtracks to the last clause chosen and attempts to find an alternative clause for the appropriate goal. As part of this backtracking it uninstantiates all variables that were instantiated in the course of the prior attempt to satisfy the goal.

For example, the database may comprise the facts:
likes (john, mary)
likes (robert, susan)
likes (michael, mary)
likes (paul, wendy)
likes (john, wendy)
likes (michael, susan)
likes (robert, wendy)
likes (robert, mary)

If the query is:
? - likes (X, mary) and likes (X, wendy), the program searches through the database to find the first person who likes Mary. The first fact indicates the John likes Mary and the variable X is instantiated to john. To satisfy the second subgoal, the program then checks to see of John likes Wendy. It locates this fact in the data base and reports that X=john in satisfaction of the query. The program then resets the variable and searches for someone else who likes Mary and Wendy. It locates the fact that Michael likes Mary, and the variable X is instantiated to michael. However, further search of the database does not locate the fact that Michael likes Wendy. According, the program backtracks to the fact that Michael likes Mary, uninstantiates the variable and resumes the search for other facts relating to who likes Mary. Next, it finds the fact that Robert likes Mary and instantiates the variable X to robert. It then locates the fact that Robert likes Wendy and reports that X=robert in satisfaction of the query. At this point the search is done.

The policy for removing and adding goals to the resolvent is called the scheduling policy of the interpreter. Prolog's scheduling policy is to maintain the resolvent as a stack. Instead of arbitrarily removing a goal from the resolvent, the first goal in the resolvent stack is popped. The body of the reducing clause is pushed on the resolvent stack, starting from the last goal in the body.

A nondeterministic choice for a reducing clause is simulated by (1) sequential search through the clauses typically in the order in which they appear in the database and a search through the terms of a clause from left to right and (2) backtracking. When attempting to reduce a goal, the first clause in the program whose head unifies with the goal is chosen. If no unifiable clause is found for the popped goal, the computation is unwound to the last choice made of a clause, and the next unifiable clause is chosen.

As will be apparent, a large database and a complicated conjunction of goals will impose a considerable searching burden on any available serial (von Neumann-type) computer. For this reason, it is desirable to perform such searching of the database in parallel and several concurrent programming languages for doing so are presently being developed.

Concurrent programming languages exploit the parallelism inherent in logic programming using both "And-parallelism" and "Or-parallelism". Specifically, all the goals in the body of a clause are reduced in parallel, which is called "And-parallelism"; and a goal is unified with the heads of all applicable clauses in parallel and the bodies of the clauses whose heads unify are solved in parallel, which is called "Or-parallelism".

As an aid to understanding concurrent programming languages, it is useful to analogize certain elements of concurrent programming to sequential logic programming. In particular, a process in concurrent programming can be analogized to a goal in sequential Prolog;

a network of processes can be analogized to a conjunction of goals a communication channel between processes or a variable shared by several processes can be analogized to a logical variable shared between two or more goals;

rules or instructions for process behavior can be analogized to the clauses of a logic program.

In contrast to sequential Prolog, an action taken by a process in concurrent Prolog cannot be undone and backtracking is not permitted. Once a process has reduced itself using some clause, it is committed to it.

The resulting computational behavior is called committed choice nondeterminism or indeterminacy. Because of the use of indeterminacy, process synchronization is required to delay an action until enough information is available to ensure that it is a correct one.

Concurrent Prolog uses two synchronization and control constructs: the read-only annotation and the guarded clause. The read-only annotation (indicated by a question mark) can be added to any occurrence of a variable in a logic program, thereby designating it as read-only. A read-only occurrence of a variable cannot be used to instantiate that variable.

A guarded clause has the form:

$$A:-G_1, G_2, \ldots, G_m | B_1, B_2, \ldots, B_n \; m,n \geq 0$$

The commit operator, |, separates the right hand side of the rule into a guard, $G_1, G_2, \ldots G_m$, and a body, $B_1, B_2, \ldots, B_n$. Declaratively, it is read just like a conjunction: A is true if the G's and B's are true. Procedurally, the reduction of a process $A_1$ using such clauses suspends until $A_1$ is unifiable with A and the guard is determined to be true. Since the reduction proceeds in parallel, this may be read procedurally as: to solve A, first solve the guards, $G_i$, in parallel and, if successful, solve the goals in the body, $B_j$, in parallel. Thus, to satisfy a goal A, the guards of all the clauses in the procedure for A whose heads unify with A are tried in parallel; and when a guard succeeds, this guard commits. The goals in the body of the clause are then executed in parallel.

In concurrent Prolog, the goals, $G_i$, in the guard can be arbitrary programs and the applicability of a clause for reduction can be arbitrarily complex. In a subset of concurrent Prolog known as flat concurrent Prolog, the goals in the guards can contain calls only to a fixed set of simple test-predicates.

The scheduling policy for concurrent Prolog illustratively is to maintain the resolvent as a first-in-first-out queue, in which goals are removed from the front of the queue and are added at its back. This policy is called breadth-first scheduling.

SUMMARY OF THE INVENTION

The present invention relates to a method and apparatus for a version of concurrent Prolog that we will refer to hereinafter as flat concurrent Prolog (Fcp). In Fcp, the compiled code for the guarded Horn clauses of the program is grouped according to the principal functor and arity (i.e., number of terms) of the head of each clause. Each such group is called a procedure. Each clause in the program is individually encoded by the compiler into a sequence of machine instructions. The code corresponding to a single clause contains two parts: one part constitutes instructions for the head and guard and the other part constitutes instructions for the body goals.

The Fcp program operates by trying to reduce a process to one of the clauses in the procedure. When a clause try fails, the Fcp program tries to reduce the process (or goal) to some other clause in its procedure and so on for all the clauses in the procedure. If no untried clause is left and the process is still not reduced, the process is suspended. The entire program accordingly is a series of clauses; and program execution is a series of clause tries collectively referred to as a procedure try. Each state of the computation comprises a resolvent, a program and a global data state.

A program execution proceeds as follows:

1. The first process in the process queue is dequeued and a reduction attempt is made by using the clauses in the associated procedure one after another.

2. If a clause try succeeds, the clause body is enqueued into the process queue and any processes that were suspended on variables which have been changed are enqueued in the process queue. If a clause try fails, the variables on which the process is suspended are recorded in a suspension table and the next clause is tried.

3. If all clause tries fail, the process is suspended on the variables recorded in the suspension table.

In accordance with the invention, an Fcp machine is a computer comprising a memory in which all the data is stored, three sets of registers, several queues or lists and a computer program for controlling the computer as will be described below. The memory is a single data area called the "heap" in which all data is stored. As part of the heap there are two small data areas called the "trail" and the suspension table. The trail is used to record changes made in data so that such changes can be undone if a reduction attempt fails. The suspension table and associated suspension lists are used to identify all the processes that are suspended on uninstantiated variables.

The queues are also stored in the heap. The queues include the resolvent which is also called the active queue or the process queue, the activation queue, the process free list and the suspension free list. The resolvent is a list of unsolved (i.e., unreduced) processes. The activation queue is a list of all suspension lists that are to be activated by adding the processes identified in the lists to the active list. The process free list and the suspension free list are lists of process records and suspension records not in current use.

The registers include a set of general registers, a set of procedure try registers and a set of clause try registers. The general registers include a heap backtrack register that stores the value at the top of the heap before a procedure try is started, a queue front register that points at the first process in the process queue, a queue back register that points at the last process in the process queue, a process free list register that contains the address of the first process record in the process free list and a suspension free list register that stores the address of the first suspension record in the suspension free list.

The procedure try registers include a current process register that points at the process currently being reduced, a time slice register that identifies the number of process iterations that can be done, a program counter that contains the address of the next instruction to be executed, a failure label register that contains the address of the first instruction in the next clause to be tried, and a suspension table pointer that points to the top of the suspension table.

The clause try registers include a heap pointer register that points at the current top of the heap, an activation pointer register that points at the top of the activation list, a trail pointer register that points at the top of the trail, an argument pointer register that points at an argument of the current process or at the first argument of a guard, a structure pointer register that points at an argument of a compound structure, a mode register that can specify either read or write mode, and a plurality of temporary registers for holding intermediate values during a clause try.

BRIEF DESCRIPTION OF THE DRAWINGS

These and other objects, features and advantages of the invention will be more readily apparent from the following detailed description of a preferred embodiment of the invention in which.

DESCRIPTION OF PREFERRED EMBODIMENT OF INVENTION INTRODUCTION

The present invention relates to the method and apparatus for implementing a concurrent logic program. In accordance with an embodiment of the invention shown in FIGS. 1a-1e, the invention attempts to provide or solve one or more unsolved goals or processes from a source logic program comprising a plurality of clauses. The unsolved goals and the source logic program constitute the input (step 1). At step 2, each clause of the logic program is encoded into a set of machine instructions which is then saved (step 3). The clauses of the logic program are grouped according to the principal functor and arity of the head of each clause, where each such group is called a procedure.

At step 4, a plurality of queues are formed. The first queue, hereinafter sometimes referred to as the "process queue", is initialized to the set of unsolved goals (or processes) (step 5).

The invention attempts to reduce the set of unsolved goals (or processes) in the process queue by a sequence of clause tries by dequeuing one or more of the unsolved goals (or processes) and executing the machine instructions with respect to them (step 10). Execution continues until the process queue is empty (step 6), whereupon the set of unsolved goals (or processes) have been successfully reduced, or until no reduction transitions are possible (step 8), whereupon a deadlock or failed state has been reached.

Changes in the computer memory resulting from clause tries are recorded in the trail (step 11). Upon failure of one of said clause tries, the trailed changes are undone (step 14).

Unsolved goals (or processes) which are spawned from successful clause tries are enqueued onto the process queue (step 21).

Step 13 and 16 illustrates the suspension of a clause try. When a clause try fails because a variable was not instantiated, the unsolved goal which the clause try was attempting to reduce suspends on that variable and the variable is enqueued onto a second queue, hereinafter sometimes referred to as the "suspension queue". Each uninstantiated variable on the suspension queue references unsolved goals (or processes) which have suspended on that variable. When a variable is instantiated during a cluase try, its element of the suspension queue is appended to a third queue, hereinafter sometimes referred to as the "activation queue". All suspended unsolved goals (or processes) referenced by the suspension queue are activated upon commitment of that clause try.

Figure 1A:
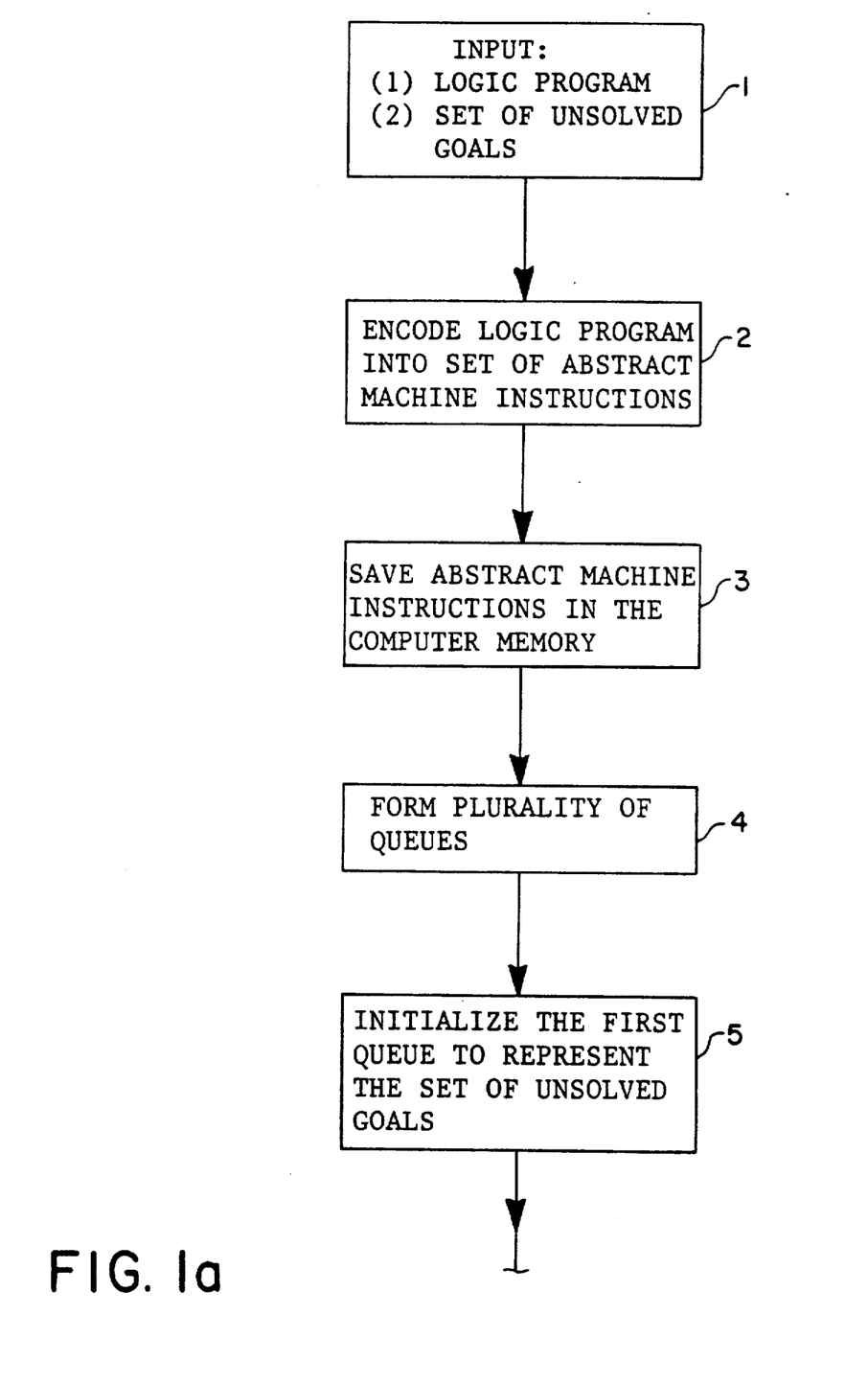
FIGS. 1a-1e are a flowchart of the invention which provides for the method of implementing a concurrent logic program.
Figure 1B:
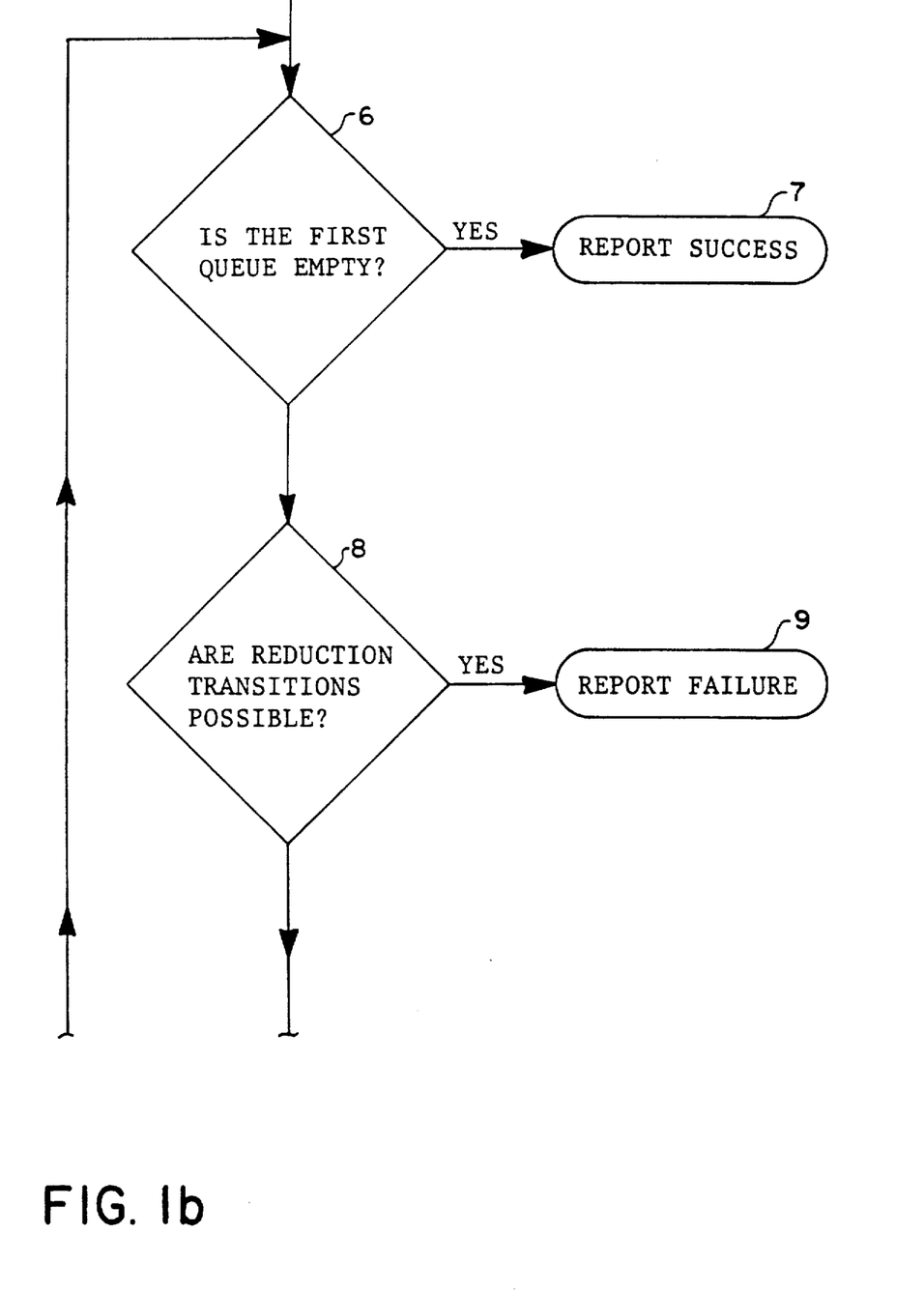
Figure 1C:
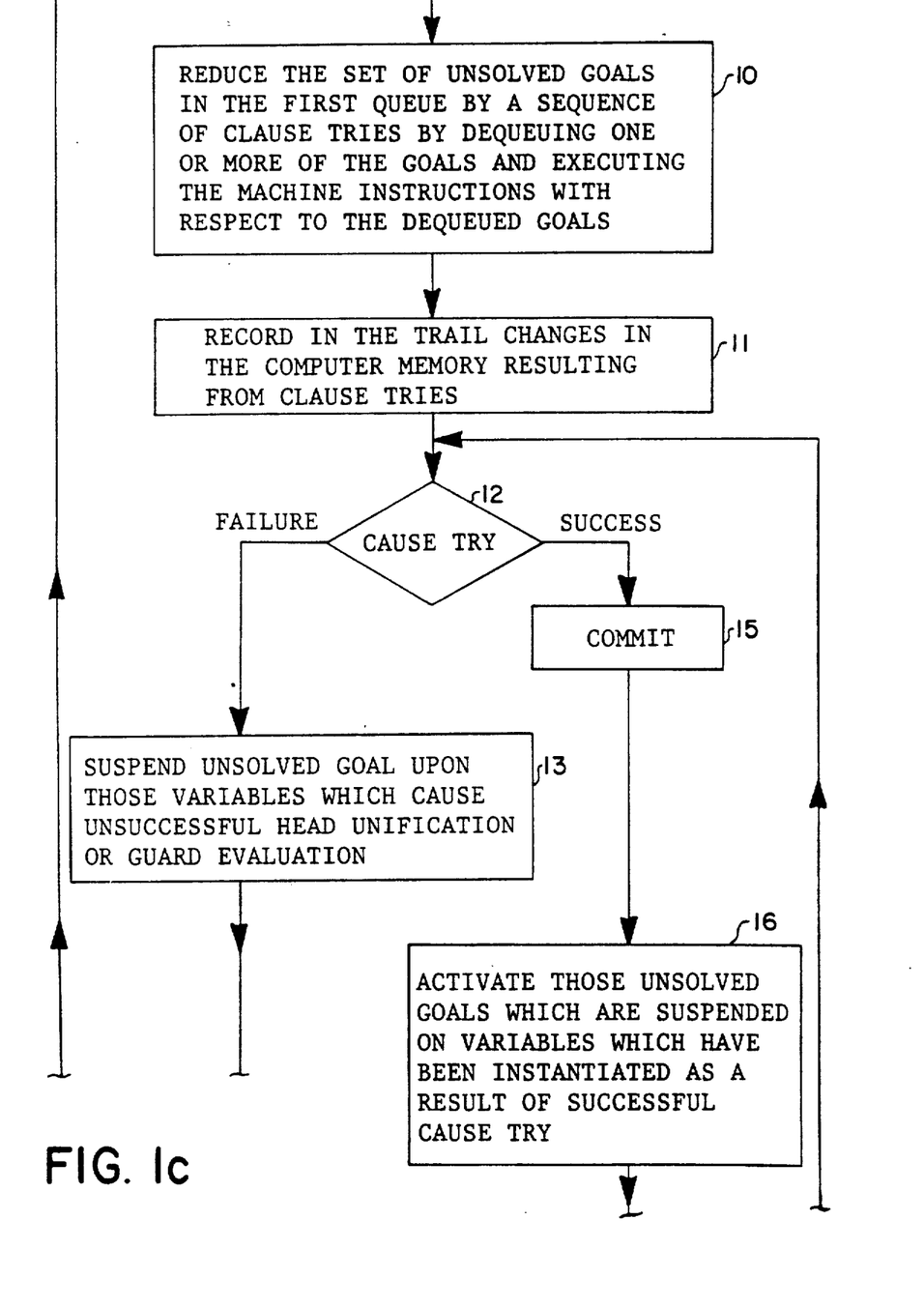
Figure 1D:
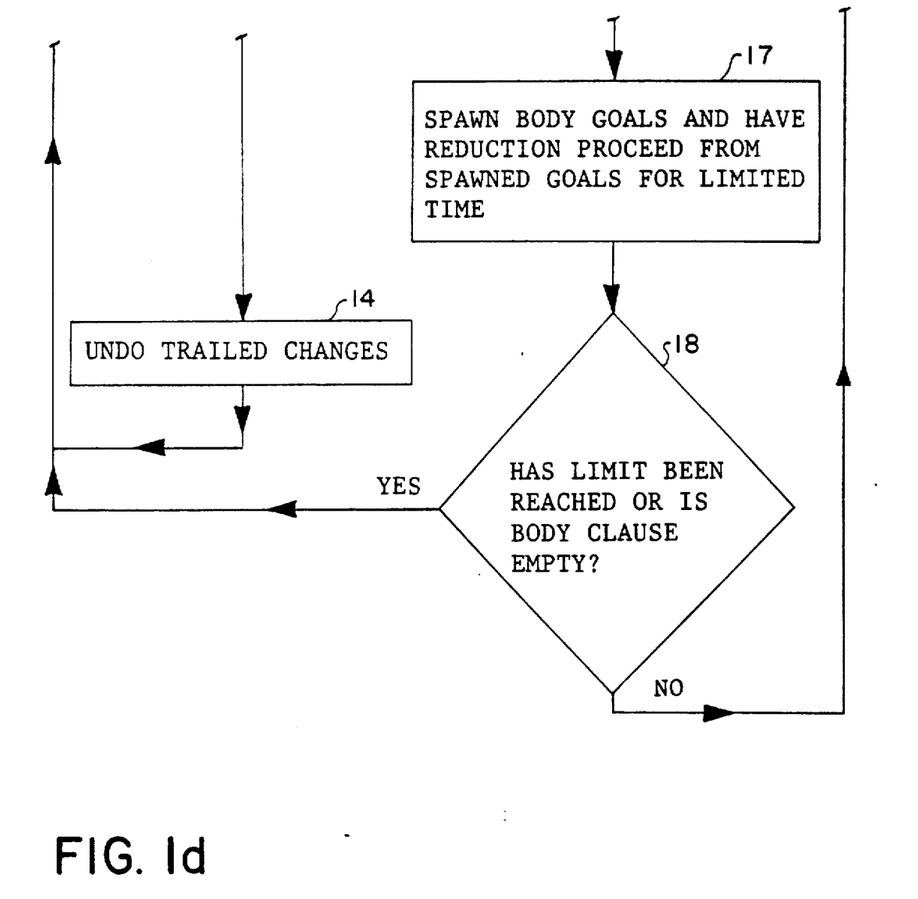
Figure 1E:
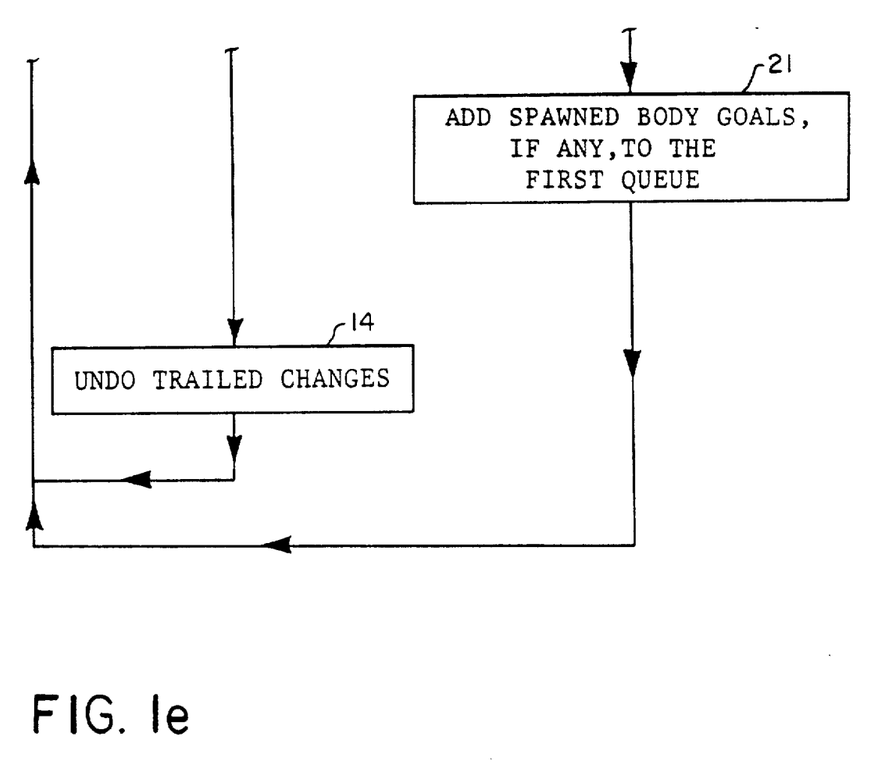
Figure 2:
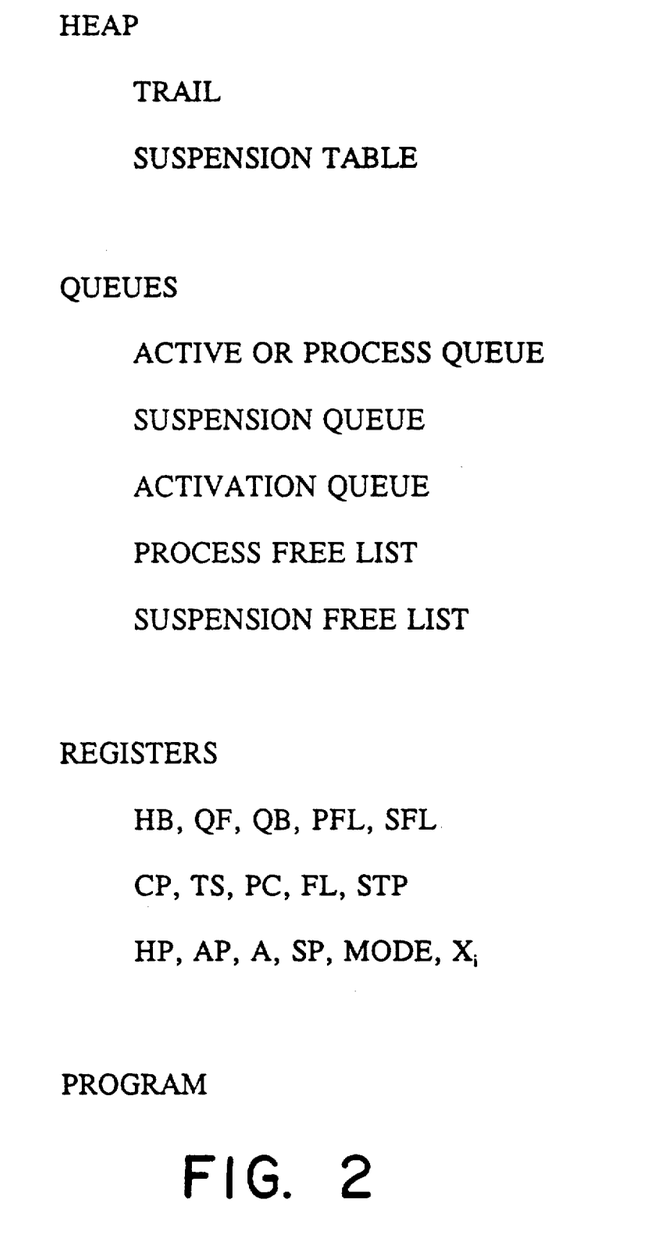
FIG. 2 is a schematic illustration of an Fcp machine.

The following description of the flat concurrent Prolog (Fcp) machine consists of three parts. The first part describes the components of the machine. As shown in FIG. 2, major such elements comprise the heap, several queues that are allocated on the heap, numerous registers and the Fcp program. The second part describes the machine's operation by describing two cycles of the operation. One is the "procedure try" in which the machine is trying to reduce the process to each clause of its procedure until commitment or no clause is left. The other cycle is the "clause try" in which the machine is trying to reduce the process to some clause of its procedure. The clause try is finished when the clause commits, suspends or fails. In the third part a description is given of the instruction encoding and instruction types.

The Fcp program operates by trying to reduce a process to one of the clauses in the procedure. Upon success of any clause try, the process commits and the clause body is enqueued to the process queue. When a clause try fails. the Fcp program tries to reduce the process (or goal) to some other clause in its procedure and so on for all the clauses in the procedure. If no untried clause is left and the process is still not reduced, the process is suspended.

Upon commitment of a reduction attempt to one of the clauses, the process record of the committed process becomes available for reuse. Moreover, the execution may proceed with any one of the processes being enqueued to the process queue from the clause body. However, instead of enqueuing the process to the process queue, execution advantageously may proceed with the chosen process as shown in the alternative steps 17 and 18 of FIG. 1e. This scheme reduces process switching and saves dequeuing and enqueuing of the process. To assure the fairness of the scheduling policy, the number of times that this "optimization" can be used must be bounded. This is done by means of a counter called a "time-slice". When a process is dequeued from the process queue, its time slice is initialized to a compiler constant. The time alice is decremented each time the execution iterates; and when it is exhausted (i.e., it is zero), the optimization is not carried out. Instead the process is enqueued into the process queue. This optimization leads to a bounded depth-first control strategy. The method is particularly useful for code segments which involve tight iterative loops since process switching does not impact their efficiency.

No order is imposed on the processes (or goals) to be reduced (or rewritten) and for simplicity they are usually tried in text order. Thus, computation proceeds by non-deterministic process selection. This feature permits the reduction of processes in parallel. Hence, the resolvent is regarded as and-parallel. In addition, all attempts to perform rewriting using a clause may be done in any order. Thus, the choice of clause is based on ornondeterministic choice.

In flat concurrent Prolog, a term is either a variable or a structure. A variable is a single assignment variable which has two occurrences: a write-enable occurrence by which the variable can be assigned and a read-only occurrence that cannot be used for assigning the variable. A structure is either a constant or a compound structure which is a composition of terms.

The unification of two terms is defined as in Robinson but augmented to distinguish between occurrences of the variable.

a. A write-enable occurrence of a variable is unifiable with any term and the variable is instantiated to the term.

b. Two constants are unifiable if and only if they are identical.

c. Two compound structures are unifiable if and only if each term in one compound structure is unifiable with a corresponding term in the other.

A success state is the state in which the resolvent is empty.

A deadlock or failed state is the state which is not a success state but no reduction transition is possible.

I. COMPONENTS

Areas

Since all runtime structures are constructed from valid data types, there is no need to allocate runtime structures from a special area. Thus, a single data area, the heap, is used for the allocation of terms, programs and processes. The heap is a big stack containing tagged objects. Since processes cannot backtrack, the heap will never decrease in size unless garbage collection is done.

Two small data areas are provided for a "trail" and a suspension table. The trail is a small stack which is empty at the start of a clause try. Whenever a heap word is changed, a new entry containing the address of the changed word and its previous value is pushed to the trail. Upon a clause try failure, the trailed changes are undone, using the trail entries. The suspension table is empty at start of a reduction attempt. Whenever a clause try fails because a variable was not instantiated, the address of the variable is added to the suspension table. For each such variable, a suspension queue or suspension list of records is maintained, each record identifying the process suspended on that variable. For more details on the suspension table and suspension queue, see the concurrently filed "Method and Apparatus for Evaluating Concurrent Logic Program" incorporated herein by reference.

Data types

The Fcp machine uses a tagged architecture in which every term has a tag that identifies the type of data and a value. Five Fcp data types are atomic objects: the variable, the reference, the read-only reference, the integer and the string.

The basic data type is the variable. Its value can be an address in the heap, which is a list of the processes suspended on that variable, or a null value if no process has suspended on it.

Two data types are used for referencing other data types: the reference and read-only reference. Both have a heap address as their value. The reference is used as a general reference to other data objects. The read-only reference is used for creating read-only occurrences of a data type (e.g., X?). During dereferencing of an argument, if a read-only reference is encountered and the data object at the end of the claim is a variable, the argument is considered as a read-only occurrence of that variable.

The integer is simply a positive or negative integer, and the string is a string of characters. The value of the string consists of four parts, the hash, the length, the offset and the characters themselves. The hash is computed from the value nf the characters. As described in application Ser. No. 807,552 for "Method and Apparatus for Comparing Strings Using Hash Values", now U.S. Pat. No. 4,899,128 which is incorporated herein by reference, it is used to avoid comparing the characters of strings when the hash of the strings to be compared differ.

The offset of the string is used to identify a special type of string called a "module". In order to link between compiled programs the standard solution is to associate entry points with symbols, and each compiled program has a symbol table, which is managed by a dynamic or static linker. The approach taken by the Fcp machine is to do the linking between modules by the Fcp program itself. The module is used for representing a compiled Fcp program as a valid relocatable data object; and in general, the module contains a string for each procedure and string appearing in the source programs so that regular strings within the module are unique. If the offset is zero, the string is not part of a module. If it is −1, the string is itself a module. In all other cases, the string is part of a module and the string-offset is the number of words from the start of the module to the string.

A new module is activated (started) by creating and enqueuing a standard form process whose procedure is the first procedure in the module. The first procedure in the program is written as the module manager, that is it can receive messages (i.e., remote procedure calls) to which it responds by activating a process executing a local procedure. As a result, a static symbol table together with an external program (linker) is replaced by a procedure (the "module manager"), whose code is part of the module, and an active process, which executes this procedure. This process knows how to serve remote procedure calls, effectively achieving dynamic linking. With this method of a module system, a big system consisting of a lot of modules can be created without doing any linking between the modules. As a result modules can be replaced at run time without rebooting all the system. This flexibility of the system is most important in a parallel architecture where each module can reside on a different processor, and rebooting all the system can be a complicated task.

The remaining data types are compound objects: the tuple and the list-cell. The value of the tuple has two parts: the arity and the arguments, where arity is the number of arguments.

The list-cell as its name implies is used for building lists, it can contain only two arguments called the car and the cdr. To reduce the space required for list representation, a technique called car-coding is used. In car-coding the tag of the list-cell is condensed into the tag of the car, saving one heap word for each list cell. Furthermore, since the cdr is generally a reference to another list-cell, this next list-cell is put at the place where the cdr would have been. This method can be applied to the cdr of the next list-cell and so on. Hence, the list [1,2,3] can be represented by four consecutive heap words (the fourth is []) instead of using three separate list-cells.

Lists can be created using separate car coded list-cells and can be condensed at garbage collection. Condensed lists can also be created by recursive procedures which produce only one list-cell at every iteration. For example:

merge([X|Xs], Ys, [X|Zs]) :-merge(Ys?, Xs?, Zs).

merge(Xs, [Y|Ys], [Y|Zs]) :-merge(Ys?, Xs?, Zs).

Since the machine continues to reduce the current process for some time slice, the list-cell created by the previous reduction during the time slice will be found at the top of the heap and the variable Zs will be its cdr. Checking whether a variable is at the top of the heap before instantiating it to a new list-cell enables us to creat the list-cell at the location of the variable itself instead of instantiating the variable to a reference to the list-cell. Hence the sublist created by merge during one time slice is condensed.

Data structures

The Fcp machine manages various data structures for handling the processes. All these data structures are built from the data types of the machine, and are allocated on the heap. The structures include the resolvent (or active or process queue, the suspension queue, the activation queue, the process free list and the suspension free list.

Each active or suspended process is represented by a "process record" which is a tuple containing: a reference to the procedure for the process, the arguments of the process and a link. The link is used for linking all the the active processes in a queue called the "active queue". This link is also used to link processes that halted to a list of free processes called the "process free list".

As described in copending application Ser. No. 875,117, for "Method and Apparatus for Evaluating Concurrent Logic Program", when a process is suspended a "process hanger" is created for the process and a "suspension record" is created for each variable in a suspension table. The process hanger is a tuple that contains a reference to the process as long as the process is suspended. When the process is activated, the argument of the process hanger is changed, illustratively, to the integer zero. Each suspension record is a list-cell whose car is a reference to the process hanger while its cdr is set to a reference to the last suspension record in a "suspension list" of one of the variables. A suspension list is a circular list of suspension records. The variables value is set to the address of the last enqueued suspension record.

When a variable is instantiated during a clause try, its suspension list is appended to the "activation queue". The activation queue is itself a suspension list containing all the processes to be activated if and when, the clause try commits. After the activation queue is used for activating the processes in it, it is linked to a free list of suspension records called the "suspension free list".

When a process is reduced to a clause which has some body goals, its area is reused for creating the process for the goal to be iterated. But when the body of the clause is empty, the memory area of the reduced process cannot be reused until garbage collection. The same applies for the memory area used for building the activated suspension lists. In order to reuse these areas and reduce the frequency of garbage collection, the machine maintains the process free list and the suspension free list. Whenever an area for a process or for a suspension list is needed, the machine tries to allocate this area from the free list first.

Registers

The current state of the machine is defined by the contents of its registers. The registers can be divided into three groups according to the time in which their value is significant. The groups are: the general registers which are significant throughout all the machine's operation, the process try registers and the clause try registers.

General Registers:
HB Heap Backtrack: stores the value of the top of the heap before a procedure try is started.
QF Queue Front: points at the first process in the process queue.
QB Queue Back: points at the last process in the process queue.
PFL Process Free List: the address of the first process in the process free list.
SFL Suspension Free List: the address of the first suspension cell in the suspension free list.
Process Try Registers:
CP Current Process, points at the process currently being reduced.
TS Time Slice: the number of the process iterations that can be done.
PC Program Counter: the address of the next instruction to be executed.

FL Failure Label: the address of the first instruction in the next clause to be tried.
STP Suspension Table Pointer: points at the top of the suspension table.
Clause Try Registers:
HP Heap Pointer: points at the current top of the heap.
AP Activation Pointer: points at the activation list.
TRP Trail Pointer: points at the top of the trail.
A Argument pointer: points at an argument of the current process or at the first argument for a guard.
SP Structure Pointer: points at an argument of a compound structure.
Mode Mode register: can specify either read or write mode.
$X_i$ One of the temporary registers used for holding intermediate values during the clause try.

II. OPERATION

As indicated above, each clause in the program is represented by a sequence of instructions. In order to try a certain clause, the machine emulates (interprets) the instructions for the clause with respect to the current process. The encoding of a general clause has two parts: instructions for head plus guard and instructions for body goals. The instructions for the head plus guard test the arguments of the process to validate that they are what is expected by the clause. These instructions might instantiate variables, create new terms, fail the clause try or add variables to the suspension table. If the process has passed the test of the head plus guard instructions, it commits to that clause. The instructions for the body of the clause can do the following which is referred as spawning:

a. Create processes for the body goals.
b. Enqueue the processes to the process queue.
c. Check the time slice and try to iterate one of the body goals.
d. Halt the process when the body is empty.

The state and the basic operations of the machine during the procedure and the clause try are as follows.

At start of the procedure try:

The procedure try is a sequence of clause tries made until some clause reaches commitment or no clause is left. At the start of the procedure try (i.e. before the first clause try) the machine is in the following state. The suspension table is empty ready for accumulating the addresses of the suspending variables from the clause tries. The current process is represented by three registers: CP points at the current process record, TS contains the number of process iterations that can be done using the current process record and PC points at the first instruction of the procedure (or the first instruction of the first clause).

At start of a clause try:

Another name for the clause try is extended unification which is defined as the unification of the goal with the head of the clause and the evaluation of the clause guard. The clause try is done in the textual order of the clauses in the program; and it is finished when a suspension or failure occurs or when the clause guard has been evaluated successfully (commitment). At the start of each clause try the machine is in the following state. The trail is empty ready for trailing variable instantiations, HP is equal to HB and the activation queue is empty. The current clause is represented by PC which points at the first instruction for the clause while A is pointing at the first argument of the current process (goal).

At clause try:

Four basic operations may occur during the clause try: dereferencing, variable assignment, unification and guard call. Dereferencing is the operation of obtaining the "real" value of an argument. It is done by examining the value of the argument and repeatedly following references and read-only references until a data type which is neither a reference nor a read-only reference is found. This data type is said to be the (dereferenced) value of the argument. If the value of the argument is a variable and a read-only reference was encountered during the dereferencing, then the value of the argument is regarded as a read-only occurrence of the variable.

Variable assignment is the operation of assigning some value to a variable. If the variable was not created by the current clause try (i.e. its location is below HB), the suspension queue of the variable is appended to the activation queue and its value is trailed.

Unification of two terms is started by dereferencing both of the terms. If one of the terms is a variable (not a read-only occurrence), it is assigned the value of the other term. The variable is assigned a readonly reference when the other term is a read-only occurrence. If both terms are non variables, unification succeeds if the terms are the same data types with the same value. Unification of tuples or lists is done by recursion on their arguments. Unification of a read-only occurrence with a non-variable term causes a suspension on the read only occurrence.

Before calling the guard, the arguments for the guard are put in consecutive X registers while A is set to point at the X register which contains the first argument. The guard may succeed, suspend or fail.

Finishing a clause try:

Each clause try may have one of three outcomes: suspension, failure or commitment. Suspension is similar to a failure but the address of the suspending variable is added to the suspension table. At failure, the impact of the clause try is undone by resetting HP and resetting instantiated variables to their previous values. A new clause try is then started by resetting the trail and activation queue to empty and setting PC to point at the first instruction of the next clause to be tried which address is found in the FL register.

The main consequence of commitment is the activation of the suspended processes which appear in the activation queue. Each process is enqueued to the active queue while its hanger is set to zero preventing reactivation of the same process. The heap is set by setting HB to HP; and the trail and suspension table are reset to empty (discarded) while the activation queue is linked to the suspension free list.

Finishing the procedure try (and starting another):

If at some point during the procedure try PC is pointing at the end of the procedure (represented by a special instruction), then the procedure try can have one of only two outcomes: failure or suspension. Failure occurs when the suspension table is still empty at this point which means that the current process has failed (i.e., can never be reduced) and the machine stops.

If the suspension table is not empty, the current process is suspended on the variables which appear in the suspension table. This is done in two steps. First, a process hanger is created referring to the current process. Second, a suspension record referring to the process hanger is enqueued to the suspension queue of each variable in the suspension table. After the process has been suspended, a new procedure try is then started by resetting the suspension table to empty and dequeuing a new process.

After commitment, if the process has committed to a unit clause, the current process record is linked to the process free list and a new process record is dequeued. Otherwise (i.e., committment to a non unit clause), processes for all the body goals but the first are spawned. The spawning is done by allocating a process record for each goal, putting the procedure and arguments of the goal in it and enqueuing it to the active queue. The procedure and arguments for the first goal in the body of the clause are put in the current process record.

If the Time Slice Register is still greater than zero, it is decremented and a new procedure try is started by setting PC to point at the procedure of the current process record. Otherwise, the current process is enqueued to the active queue and a new process record is dequeued.

If the active queue is empty when the machine tries to dequeue a process, the machine stops. Otherwise, the machine dequeues a process by setting CP to point at the first process record in the queue and setting QF to point at the next process record in the queue. A new procedure try is then started by initializing the Time Slice Register to the initial time slice value and setting PC to point at the procedure of the current process record.

III. INSTRUCTIONS

Procedure Encoding

The code for a procedure is a sequence of abstract instructions. When a clause try fails, execution should proceed in the next clause try. This is achieved by the instruction "try_me_else Failure_Label". When the clause try following the instruction fails, execution proceeds from Failure_Label.

Upon failure of all the clause tries, the process is to be suspended on the variables in the suspension table. After the last clause try of a procedure, a suspend instruction is planted to suspend the process. The failure-label of the last clause refers to this instruction.

The scheme of an encoded procedure is as follows:

| | |
|---|---|
| P: | |
| | try_me_else C2 |
| | (code for first clause) |
| C2: | try_me_else C3 |
| | (code for second clause) |
| | .... |
| Cn: | |
| | try_me_else S: |
| | (code for last clause) |
| S: | |
| | suspend |

Clause Encoding

The code for a single clause try is constructed from abstract instructions for head unification and guard execution. In addition, instructions for commit and spawning of the body processes must also be planted.

The scheme for a clause encoding is as follows:

| |
|---|
| (code for head unificaton + guard execution) |
| commit |

-continued

| (code for body spawn) | |
|---|---|

Head Unification

A stack is not required but rather a set of registers can be used to hold pointers to the arguments. Since the data type of the clause argument is also known at compile time, the clause part of the pair can be omitted and can be represented by different abstract instructions.

Some optimizations can be carried out before the final encoding. When a constant appears in the clause, the goal argument would be pushed onto the stack and later popped either to match or assign a goal variable. These push and pop operations can be carried out together and encoded into a single instruction. When a variable appears in the clause which does not require general unification, the operation succeeds trivially and thus can be omitted.

The following primitive instruction types form the basic operations on the above stack and encode the structure of the data required:

compound Arity
  Corresponds to a pop of the stack and match or assignment of a compound structure.
constant Value
  Corresponds to a match or assignment of a constant.
var $X_i$
  Corresponds to a push into the stack of an argument.
ro_var $X_i$
  Corresponds to a push into the stack of an argument when the clause argument is annotated read-only.
val $X_i$
  Corresponds to general unification for subsequent occurrences of a variable in a clause.
ro_val $X_i$
  Corresponds to general unification for subsequent occurrences of a variable in a clause when annotated read-only.

The abstract machine uses more than one instruction for each of the above primitive instruction types. The different instructions correspond to the primitive data types in the language. In addition different instructions are used to distinguish the first and subsequent levels in the execution tree.

There are two types of head instructions: get and unify. Unify instructions correspond to the actions that would normally be executed by the unification algorithm and may thus execute in either read or write mode. The get instructions occur only at the first level of the head structure and thus always operate in read mode.

Most clause heads have some compound structure as an argument. Pushing and popping the argument at this level would be an overhead. In order to avoid this overhead, a different argument register is used by the get instructions. Thus the encoding of a compound structure appearing at the first level of the head is a get_compound instruction immediately followed by the unify instructions for its arguments.

The encoding of the arguments of the clause head "p(f(X,X?),X)" is:

| get_compound 3 | |
|---|---|
| unify_constant'f | %f |
| unify_var Xn | %X |
| unify_ro_val Xn | %X? |
| get_val Xn | %X |

A nested compound structure is encoded by a "unify_var $X_i$" instruction which loads its location into the $X_i$ register. A corresponding "unity_compound $X_i$, Arity", following the current unify sequence, gets the location of the sub-compound structure, enabling the following unify instructions to operate on its arguments. Thus the encoding of the arguments of the clause head "p(f(1, f(X?), X),1)" is:

| get_compound 4 | |
|---|---|
| unify_constant 'f | %f |
| unify_constant 1 | %1 |
| unify_var Xm | % (save "F(X?)") |
| unify_var Xn | %X |
| unify_compound Xm 2 | % (load "F(X?)") |
| unify_constant 'f | %f |
| unify_ro_val Xn | %X? |
| get_constant 1 | %1 |

Arguments Creation

An argument creation in the guard or the body of the clause cannot be executed in read-mode. Thus another type of argument instruction, "put", is added which corresponds to the operation of the unify instructions in write-mode. The justification for having these instructions explicitly is similar to that of get instructions. The put and get instruction use the same argument register for their operation. The put instructions also correspond to the arguments in the first level of the clause. The instructions for creating the arguments for the goal "q(a,g(g(X),1))" are:

| put_constant 'a' | %a |
|---|---|
| put_compound 3 | |
| unify_var Xm | % (save "g(X)") |
| unify_constant 1 | %1 |
| unify_compound Xm, 2 | % (load "g(X)") |
| unify_constant 'g' | %f |
| unify_var Xn | %X |

Guard

The encoding of a guard call is composed of two parts: creating the arguments for the guard and an instruction which calls the guard.

In order to enable optimizations of the arguments allocation for a guard, the X registers are used for transferring arguments to the guard. If the arguments the guard needs have already been loaded to consecutive X registers, no arguments allocation is needed.

Two instructions are necessary for guard encoding: "guard $X_i$" sets the argument register to the $X_i$ register. The following put and unify instructions will create arguments starting at $X_i$. The actual call to the guard is carried out by the "call $X_i$, Index" instruction where $X_i$ refers to the first argument for the guard and Index is its internal number. The encoding of the clause "p(X, Y):- guard (Y, X) q(X, Y)." will be:

| try_me_else Label | |
|---|---|
| get_var X0 | %X |
| get_var X1 | %Y |
| guard X2 | % start creating the arguents for the guard |
| put_val X1 | %Y |
| put_val X2 | %X |

```
call X2 Index
commit
(code for body)
```

If the arguments of the guard are already at consecutive X registers, the guard encoding is simply the instruction "call $X_i$, Index" where $X_i$ is the register holding the first argument of the guard. Thus the encoding of the clause "p(X,Y):-guard (X,Y) true." will be:

```
try_me_else Label
get_var X0            % X
get_var X1            % Y
call X0 Index         % X and Y are already in %
                      consecutive X registers.
commit
halt
```

Body

An empty body is encoded into a single instruction called halt. This instruction frees the current process record for future use and returns control to the scheduler. A non-empty body is encoded to do the following operations:

a. Allocate process records for body goals.
b. Create the arguments for each process.
c. Enqueue the body processes into the process queue.
d. Iterate on one of the body processes if the time slice is not exhausted.

The allocation and enqueuing of new processes is carried out by the spawn instruction. The creation of arguments is carried out by the put and unify instructions. Since the current process record is used for tail recursion optimization there is no need to allocate a process record for the goal to be iterated (i.e. the first goal). The commit instruction is followed by the instructions which create arguments for the first goal in the body. The last instruction in the encoding of a non-empty body is an execute instruction which tries to iterate on the goal represented by the current process record.

```
(code for args of first goal)    % putting
                                 arguments for the
                                 first goal in
                                 current process.
spawn Proc2                      % Proc2 is
                                 procedure for
                                 second goal.
(code for args of second goal)   % putting
                                 arguments of goal
                                 in the process.
....
spawn Procn                      % Procn is
                                 procedure for last
                                 goal.
(code for args of last goal      % Proc1 is
execute Proc1                    procedure for
                                 first goal.
```

Instruction Set

The instruction set can be divided to four types of instructions: clause (or indexing) instructions, argument instructions, guard instructions and process instructions.

Clause (Indexing) Instructions

The clause instructions deal with clause selection. Currently only one clause instruction is used preceding the encoding of each clause. This instruction, "try_me_else Offset", tells the machine the address of the next clause to be tried in case the current clause try fails. Obviously, more clause instructions can be added to do clause selection according to some arguments of the process.

Argument Instructions

The argument instructions are used for two purposes: execution of the known part of the unification algorithm and allocating data structures. For the verification of the global data state, get and unify instructions are used. Allocating process records and guard arguments is performed using put and unify instructions. The data structure to be verified or allocated is implicitly encoded into the different instructions. The get and put instructions use the A register which refers to the arguments of the process record while the unify instructions use the SP register which refers to general data structures. Each of the argument instructions increments the register it uses upon successful completion. Some of the instructions explicitly use the set of X registers to write or read values.

Get Instructions

The get instructions correspond to the arguments of the head of a clause and are responsible for matching against the process's arguments given in the A register. Main instruction types are:

get_var $X_i$

This instruction is used for a first occurrence of a variable in the clause. The instruction simply stores the argument given by A in $X_i$.

get_ro_var $X_i$

This instruction is used for a first occurrence of a variable in the clause. This occurrence is annotated by the read-only notation. If the argument given by A contains a write-enable occurrence of a variable, that variable is bound to a read-only occurrence of a new variable while $X_i$ is set to the write-enable occurrence of it. Otherwise, the argument given by A is stored in $X_i$.

get_value $X_i$

This instruction is used for the second or more occurrences of a variable in the head of the clause. General unification is applied for the argument referenced by the A register and the argument referenced by the $X_i$ register.

get_ro_val $X_i$

This instruction issued for the second or more occurrences of a variable when annotated read-only. General unification is applied with the read-only occurrence of this variable and the current argument. If after the unification $X_i$ contains a write-enable occurrence of a variable, that variable is bound to a read-only occurrence of a new variable while $X_i$ is set to the write-enable occurrence of it.

get_constant Value

This instruction is used for a constant appearing in the head of the clause. If the global argument referenced by the A register has a value, it is matched against Value. If the global argument is a read-only occurrence of a variable, suspension occurs. If it is a write-enable variable, Value is assigned to it and this assignment is trailed.

get_compound Arity

This instruction is used for an occurrence of a compound structure in the head of the clause. The instruction prepares for the following unify instructions. If the global argument referenced by the A register has a value, its arity is matched against Arity. The SP register is set to refer to the first argument and execution proceeds in read-mode. If the global argument is a read-only occurrence of a variable, suspension occurs. If it is a write-enabled variable, a space for the structure is allocated at the top of the heap, SP is set to point at the allocated space, the variable is assigned to a reference to the new structure and this assignment is trailed; execution proceeds in write mode.

Put Instructions

The put instructions correspond to the arguments of guards or body goals in the clause and are responsible for creating arguments at the place given by the A register. Main instructions types are:

put_var $X_i$

This instruction is used for a first occurrence of a variable in the clause. A new variable is created at the top of the heap, a write-enable occurrence of it is put at $X_i$ and in the argument referenced by A.

put_ro_var $X_i$

This instruction is used for a first occurrence of a variable in the clause when annotated read-only. A new variable is created at the top of the heap, a write-enable occurrence of it is put at $X_i$ and a read-only occurrence of it is put in the argument referenced by A.

put_value $X_i$

This instruction is used for the second or more occurrence of a variable in the clause. $X_i$ is stored in the argument referenced by A.

put_ro_value $X_i$

This instruction is used for the second or more occurrence of a variable in the clause when annotated read-only. The read-only occurrence of the argument given $X_i$ is stored at the argument referenced by A.

put_constant Value

This instruction is used for a a constant appearing in the guard or in the body of the clause. The constant is stored in the argument referenced by A.

put_compound Arity

This instruction is use for an occurrence of a compound structure in the guard or body of the clause. A space for the structure is allocated at the top of the heap, SP is set to point at the allocated space, and execution proceeds in write mode.

Unify Instructions

In the unification between a process and the head of a clause the unify instructions correspond to deeper levels of the execution tree. These instructions can be reached in two different modes of execution. When the data structures of the higher levels of the tree are available in the global environment the instruction is executed in read mode. When executed in this mode the unify instruction is identical to the corresponding get instructions except for the implicit argument register. When the former data structures of the global environment are variable, the instruction is executed in write-mode and the instruction is identical to the corresponding put instruction except for the implicit argument register.

The unify instructions correspond to the arguments of a compound structures and are responsible for both unifying with existing structures and for constructing new structure.

unify_var $X_i$ unify_ro_var $X_i$ unify_value $X_i$ unify_ro_val $X_i$ unify_constant Value These instructions operate as the corresponding get instruction in read mode and as the corresponding put instruction in write mode but they use the SP register instead of the A register.

The unify instructions are used also for the allocation of nested data structures in the guard and in the body encoding.

unify_compound $X_i$, Arity

This instruction is used for nested compound structures. The same as in get_compound Arity is done but the contents of the $X_i$ register are used instead of the argument given by the A register.

Guard Instructions

The guard instructions provide the mechanism for creating the arguments for a guard and for doing the guard test. The instructions are:

guard Xi

The arguments of a guard call need to be allocated before the call. This instruction initializes the A register to $X_i$. The A register is set to point at Xi so following put and unify instructions will create the arguments for the guard in a consecutive X registers starting at Xi such that $X_i$ will refer to them.

Call Xi, Index.

The arguments for a guard are in consecutive X registers starting at Xi. This instruction is a call to the guard test whose number is Index and whose arguments start at $X_i$.

Process Instructions

The process instructions correspond to the possible outcomes of a reduction attempt. The instructions are:

commit

Appears at the end of the instructions for the head plus guard of the clause and it commits the current process to the current clause. The processes in the activation list are activated, the trail and suspension table are discarded (reset) and the A register is set to point at the first argument in the current process so following argument instructions will create the argument in the current process.

spawn

Appears as the first instruction for the creation of a body goal which the machine will not try to iterate. This instruction creates a process record and enqueues it to the process queue. The procedure for the process is set to the procedure given by offset and the A register is set to point at the first argument in the allocated process.

execute

The last instruction for the nonempty body. The procedure for the current process is set to the procedure given by offset and if TS is greater then zero it is decremented and a new procedure try is started using the current process. Otherwise, the current process is enqueued to the end of the queue and a new process is dequeued.

halt

The last and single instruction for the empty body. This instruction halts the execution of the current process. The current process is entered to the process free list. Control is given back to the scheduler.

suspend

Appears as the last "clause" or instruction of the procedure. If it is reached, then no clause try succeeded. The current process is suspended. Control is given back to the scheduler.

V. FLOWCHART

Operation of the Fcp machine is best understood from the following flowchart of an emulator of the Fcp machine.

In this flowchart, the following conventions are used. If R is a register, then *R is the value of the memory location pointed to by R; and beginning_of_heap, boot, null, time_slice, trail, and suspension_table are emulator constants.

The following procedures are used in the machine emulator description:

```
procedure Enqueue
(Process)
   If QF = null          % process queue is empty
   then QF: = QB =       Process
                         % initialize queue to contain the
                         new process
   else *(QB + 2) =      Process, QB = Process
                         % add new process to the process
                         queue
procedure Dequeue
   If QF = null          % process queue is empty
   then stop             % stop the machine
   else
      CP = QF            % current process is first process
      QF: = *(QF - 2)    % update QF register to point to
                         % the next process
      A: = CP + 3        % set argument register to point to
                         % first argument of current process
      PC: = *(CP + 1)    % set program counter to program of
                         % current process
      TS: = time_slice
```

Initially the process queue contains a single process, the booting process at the address "boot". The initial values of the registers are as follows.

HB = beginning_of_heap
HP = beginning_of_heap
QF = boot
QB = boot
PFL = null
SFL = null
STP = suspension_table
TRP = trail The initial value of the other registers is unimportant. The flowchart is as follows:

```
Start:   Dequeue             % dequeue booting process.
Next:    Fetch next instruction
         Case instruction of:
         get(Arg):
               unify(*A,Arg)  % get *A, the current argument
                              % and unify it with Arg
         A: = A + 1           % Advance argument register
         Put(Arg):
               initialize(*A,Arg)
                              % initialize *A, the
                              % current argument, to be Arg.
         A: = A + 1           % Advance argument register
         unify(Arg):
               if Mode = 0    % value of Mode register is "read"
               then unify (*SP,Arg)
                              % unify *SP, the current structure,
                              % with Arg.
               SP: = SP + 1   % Advance structure pointer
                              % register
               elseif Mode = 1  % value of Mode register is "write"
         guard (Xn):
               set A to point to register Xn
         call (Index, Xn):
               call guard kernel number Index, with argument
               block starting from register Xn.
         commit:
               Activate processes in activation list.
               TRP: = trial    % reset trail pointer register
               STP: = suspension_table
                              % reset suspension table pointer
                              % register
               A: = CP + 3    % set argument register to first
                              % argument of current process
         spawn(Proc):
               Allocate a new process record, store its address
               in NPR
               *(NPR + 1): =  % initialize the program counter
                              % of the process to Proc
               Enqueue(NPR)   % enqueue process NPR
               A: = NPR + 3
         execute(Proc)P
               *(CP + 1): = Pr- % change program counter to Proc
                              oc
               If TS 0         % time-slice not exhausted
               then TS: = Ts-1; % decrement time-slice
                  A: = CP + 3  % set argument register to point to
                              % first argument of current process
                  PC: = Proc   % set program counter to Proc
               else
                  Enqueue(PC)  % enqueue current process
                  Dequeue      % dequeue next process
         halt:
               *(CP + 2): = PFL; PFL: = CP
                              % return current process to process
                              % free list
               Dequeue
         suspend:
               Suspend current process on variables in the
               suspension table.
               STP: = suspension_table
                              % resent suspension table
               Dequeue
         goto Next
``` a detailed program listing is set forth in Appendix I.

V. MISCELLANEOUS

Garbage Collection

The garbage collection algorithm used in the machine is a simple stop and copy using two heaps. This algorithm was chosen since its complexity is linear with respect to the size of useful data and Fcp programs tend to generate a large amount of garbage relative to the amount of useful data.

Since the machine can access data only through processes residing in the queue, the only data need to be copied is the data accesible from the current process and the active queue. Both free lists are discarded when a garbage collection is started, also suspension cells whose indirect reference does not refer to a suspended process are not copied. Note that suspended processes which are suspended on unaccessible variables are not copied during garbage collection. Hence, by maintaining the overall number of processes in the machine and comparing it with the number of processes that were copied during the garbage collection, the machine may detect a failure state that was not detected before. An important optimization that has to be added to the garbage collection is maintaining static data terms (modules for example) which will not be copied at each garbage collection.

Strings unification

During the computation a lot of string unifications are done, in particular clause selection is often based on the value of a string argument. Strings created at run time may cause redundant string unifications since they may be equal to existing strings. We use the following method (invented by Dr Ehud Shapiro) in order to save redundant strings unifications.

When comparing two strings, the machine checks that the two strings are not from the same module. Since all the strings in the same module are unique two strings from the same module are known to be different. If the strings are not from the same module, the hash and the length of the two strings are compared before comparing the characters. This method saves full strings comparisons in most of the cases where the strings are different.

After two strings are compared and found identical, if one of the strings is a "free" string (not within a module) this string becomes a reference to the other string. In this way redundant occurrences of strings are canceled and time and space are saved.

What is claimed:

1. A digital computer for reducing a set of unsolved goals (or processes) from a logic program comprising a plurality of clauses, said computer comprising:
   a computer memory in which is stored all data on which the program operates as well as a trail for undoing changes in said data when a clause try fails;
   means for encoding each clause of the logic program into a set of machine instructions, which, when executed, attempt to reduce the set of unsolved goals (or processes) by a sequence of clause tries;
   means for storing and accessing the set of machine instructions in the computer memory;
   means for forming in the computer memory a plurality of queues, a first such queue being the set of unsolved goals (or processes);
   means for attempting to reduce the set of unsolved goals by a sequence of clause tries by dequeuing one or more of the unsolved goals (or processes) from the first queue and executing the set of machine instructions with respect to the dequeued goals;
   means for recording in the trail changes in the computer memory resulting from clause tries, and upon failure of one of said clause tries, undoing the trailed changes;
   means for enqueuing unsolved goals (or processes) spawned from successful clause tries onto the first queue; and
   means for continuing execution either until the first queue is empty or until no further education is possible and at least one unsolved goal (or process) remains in the first queue.

2. The digital computer of claim 1 wherein second and third queues are also formed by the forming means, said second queue being a list that identifies all unsolved goals (or processes) that are suspended on uninstantiated variables and said third queue being a list of all unsolved goals (or processes) that are to be activated when a clause try commits by adding unsolved goals (or processes) identified in the list to the first queue and the digital computer further comprises:
   means for suspending unsolved goals (or processes) upon variables which cause unsuccessful head unification or guard evaluation; and
   means for activating suspended unsolved goals upon instantiation of the variables which caused unsuccessful head unification or guard evaluation.

3. A digital computer of claim 1 wherein second and third queues are also formed by the forming means, said second queue being a list of uninstantiated variables upon which clause tries have suspended, each uninstantiated variable of said second queue referencing a list of unsolved goals (or processes) which have suspended on that variable, and said third queue being a list of those elements from said second queue which are to be added to the set of unsolved goals (or processes) because their referencing variables has been instantiated, said computer further comprising:
   means for suspending unsolved goals (or processes) upon variables which cause unsuccessful head unification or guard evaluation; and
   means for activating suspended unsolved goals upon instantiation of the variables which caused unsuccessful head unification or guard evaluation.

4. The digital computer of claim 1 wherein a clause includes a head and at least one body goal, said computer further comprising:
   means from for one of the body goals spawned from said reduction having reduction proceed for a limited time from the body goal spawned from a successful reduction of an unsolved goal.

5. A method for implementing a logic programming language by reducing in parallel a set of unsolved goals (or processes) from a logic program comprising a plurality of clauses of the form H:-G1, G2, ..., Gi, ..., Gm|, B1, B2, ..., Bi, ... Bn, where $m, n \geq O$ and H is a head of the clause, each Gi is a system defined test called a guard and each Bi is a general body goal, the method comprising the steps executed by a computer of:
   encoding each clause of the logic program into a set of abstract instructions, which when executed reduces the set of unsolved goals by unifying one such unsolved goal with the head of one of the clauses, evaluating the guards of said clause with respect to the goal, and if the unification and guard evaluation are successful, replacing the unsolved goal with the set of goals, Bi, in the body of said clause;
   reducing one or more of the unsolved goals (or processes) simultaneously by executing said abstract instructions;
   undoing changes caused by unsuccessful head unifications and guard evaluations; and
   executing the abstract instructions until no more unsolved goals remain or until no more unification and guard evaluation are possible and there remain unsolved goals.

6. The method of claim 5 wherein the step of reducing one or more of the unsolved goals (or processes) further comprises the steps of:
   suspending unsolved goals (or processes) upon variables which cause unsuccessful head unification or guard evaluation; and activating suspended unsolved goals (or process) upon instantiation of the variables which caused unsuccessful head unification or guard evaluation.

7. The method of claim 5 further comprising the step of repeating for a limited number of times the encoding steps of unifying the head and evaluating the guard with a goal from the set of goals in the body of the clause resulting from a successful head unification and guard evaluation.

8. A method for implementing a logic programming language by reducing a set of unsolved goals (or processes) from a logic program comprising a plurality of clauses of the form H:-G1, G2, ..., Gi, ... Gm|, B1, B2, ... ,Bi, ... Bn, where m,n ≧ O and H is a head of the clause. Gi is a system defined test called a guard and each Bi is a general body goal with non-deterministic clause selection, the method comprising the steps executed by a computer of:

encoding each clause of the logic program into a set of abstract instructions which, when executed, reduces the set of unsolved goals by unifying one such unsolved goal with the had of one of the clauses, evaluating the guards of said clause with respect to the goal, and if the unification and guard evaluation are successful, replacing the unsolved goal with the set of goals, Bi, in the body of said clause;

reducing one or more of the unsolved goals (or processes) with one or more of the clauses simultaneously or in any arbitrary order by executing said abstract instructions;

undoing changes caused by unsuccessful head unifications and guard evaluations; and executing the abstract instructions until no more unsolved goals remain or until no more head unification and guard evaluation are possible and there remain unsolved goals.

9. The method of claim 8 wherein the step of reducing one or more of the unsolved goals (or processes) further comprises the steps of:

suspending unsolved goals (or processes) upon variables which cause unsuccessful head unification or guard evaluation; and activating suspended unsolved goals (or process) upon instantiation of the variables which caused unsuccessful head unification or guard evaluation.

10. The method of claim 8 further comprising the step of repeating for a limited number of times the encoding steps of unifying the head and evaluating the guard with a goal from the set of goals in the body of the clause resulting from a successful head unification and guard evaluation.

11. A method for implementing a logic programming language by reducing a set of unsolved goals (or processes) from a logic program comprising a plurality of clauses of the form H:- G1, G2, ... , Gi, ... Gm |, B1, B2, ... ,Bi, ... Bn, where m,n ≧ O and H is a head of the clause, each Gi is a system defined test called a guard and each Bi is a general body goal with nondeterministic clause selection, the method comprising the steps executed by a computer of:

encoding each clause of the logic program into a set of abstract instructions which, when executed, reduces the set of unsolved goals by unifying one such unsolved goal with the head of the one of the clauses, evaluating the guards of said clause with respect to the goal, and if the unification and guard evaluation are successful, replacing the unsolved goal with the set of goals, Bi, in the body of said clause;

reducing one of the unsolved goals (or processes) with one or more of the clauses simultaneously or in any arbitrary order by executing said abstract instructions;

undoing changes caused by unsuccessful head unifications and guard evaluations; and executing the abstract instructions until no more unsolved goals remain or until no more head unification and guard evaluation are possible and there remain unsolved goals.

12. The method of claim 11 wherein the steps of reducing one or more of the unsolved goals (or processes) further comprises the steps of:

suspending unsolved goals upon variables which cause unsuccessful head unification or guard evaluation; and activating suspended unsolved goals (or process) upon instantiation of the variable which caused unsuccessful head unification or guard evaluation.

13. The method of claim 11 comprising the step of repeating for a limited member of times the encoding steps of unifying the head and evaluating the guard with a goal from the set of goals in the body of the clause resulting from a successful head unification and guard evaluation.

* * * * *